United States Patent [19]

Piejko et al.

[11] Patent Number: 5,096,966
[45] Date of Patent: Mar. 17, 1992

[54] POLYMER MIXTURE FOR FLEXIBLE SHEETS

[75] Inventors: Karl-Erwin Piejko, Bergisch Gladbach; Kurt P. Meurer, Königswinter; Hans-Eberhard Braese, Cologne, all of Fed. Rep. of Germany

[73] Assignee: Bayer Aktiengesellschaft, Leverkusen, Fed. Rep. of Germany

[21] Appl. No.: 528,411

[22] Filed: May 25, 1990

[30] Foreign Application Priority Data

Jun. 6, 1989 [DE] Fed. Rep. of Germany ....... 3918405

[51] Int. Cl.$^5$ .................... C08L 51/04; C08L 33/08; C08L 69/00
[52] U.S. Cl. ........................................ 525/67; 525/64; 525/85
[58] Field of Search .............................. 525/64, 67, 85

[56] References Cited

U.S. PATENT DOCUMENTS 4,511,695  4/1985  Lindner ................................. 525/84
4,902,745  2/1990  Piejko ................................... 525/85

*Primary Examiner*—John C. Bleutge
*Assistant Examiner*—David Buttner
*Attorney, Agent, or Firm*—Connolly and Hutz

[57] ABSTRACT

Polymer mixtures of a special graft polymer based on acrylate rubber, a special rubbery acrylate copolymer, resin-type vinyl polymers and polyesters containing carbonate groups and their use in manufacturing flexible (leather-type) sheets.

2 Claims, No Drawings

POLYMER MIXTURE FOR FLEXIBLE SHEETS

The invention relates to polymer mixtures of a special graft rubber based on acrylate, a special acrylate copolymer, certain resin-type vinyl polymers and certain polyesters containing carbonate groups which are suitable for manufacturing flexible sheets which are resistant to aging and have leather-type appearance, and which can be processed by calendering and deep-drawing.

Plastic sheets having leather-type appearance are used, for example, for the interior covering of vehicles. For the most part, they are manufactured by calendering a crude sheet and subsequently deep-drawing. Mixtures of polyvinylchloride (PVC) with various vinyl polymers and plasticisers, are most often used as the plastic. These sheets are not completely resistant to aging at high temperatures, they contain volatile components which trend to migrate, as well as halogen. These disadvantages can be attributed predominantly to the polyvinylchloride. There is therefore a need for a plastic material which contains no polyvinylchloride and yet is suitable for manufacturing leather-type sheets.

A polymer mixture of a special graft rubber based on acrylate, a special acrylate copolymer, certain resin-type vinyl polymers and certain polyesters containing carbonate groups has been found which has excellent suitability for manufacturing soft sheets—also having leather embossing—by deep-drawing processes.

The sheets obtained are resistant to aging, even at high temperatures. Only a few auxiliaries (stabilisers, lubricants, mould release agents etc.) are required in small amounts for technical processing. The sheets made from the polymer mixtures of the invention adhere particularly well to other technical polymers, for example to polyurethane.

The object of the invention is thus a polymer mixture of a) 10 to 60, in particular 20 to 50 parts by weight of a graft polymer having a rubber content of 20 to 80 weight %, preferably 40 to 65 weight % and most preferably 50 to 60 weight % of
  a.1) mixtures of 20 to 40 weight % of acrylonitrile and 80 to 60 weight % of styrenes and/or alkylmethacrylates or
  a.2) methylmethacrylate, optionally mixed with up to 30, preferably 2 to 20 weight % of styrenes and/or up to 30, preferably 2 to 20 weight % of alkylacrylates and/or up to 19, preferably 2 to 25 weight % of acrylonitrile, onto
  a.3) a particle-type highly crosslinked alkylacrylate rubber which may contain copolymerised up to 30, preferably 0.5 to 10 weight %, of dienes, having an average particle diameter ($d_{50}$) of 80 to 1,000 nm, b) 10 to 50, in particular 10 to 40 parts by weight of a partially crosslinking rubber-type copolymer made from 5 to 40, preferably 10 to 35 weight %, of acrylonitrile, styrene, alkylmethacrylate or mixtures thereof and 95 to 60, preferably 90 to 65 weight %, of alkylacrylate having a gel content of 20 to 99 weight %, a swelling index greater than 10, measured in dimethylformamide at 23° C., and an average particle diameter ($d_{50}$) of 100 to 600 nm, in particular 100 to 300 nm, c) 5 to 40, preferably 10 to 30 parts by weight of a non-crosslinked polymer of styrenes, acrylonitrile, methacrylonitrile, esters of (meth)acrylic acid, vinyl-$C_1$–$C_4$-carboxylic acids or mixtures of these monomers having Staudinger indices [$\eta$] (measured in dimethylformamide at 23° C.) of 0.3 to 1.5 dl/g, and d) 1 to 40, in particular 5 to 30 parts by weight of a polyester containing carbonate groups and having recurring structural units of the formula

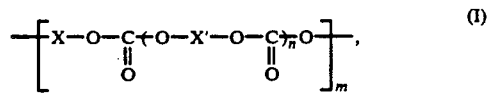

in which

X is the radical of a reaction product of a multivalent alcohol and a multivalent aliphatic carboxylic acid having a molecular weight of 800 to 5,000, X′=X or is the radical of an aliphatic polyether of molecular weight 800 to 5,000.

n=0 or is 1 to 20, and m denotes a number greater than 20, preferably 22 to 100.

Graft polymers a) according to the invention are generally emulsion polymers having particulate structure. They consist of particulate alkylacrylate rubbers having a gel content of greater than 50, preferably 70 to 99 weight %, and average particle diameters ($d_{50}$) of 80 to 1,000 nm, as the graft base, and attached to it graft-polymerised monomers, such as alkyl(meth)acrylates, styrenes, such as styrene, α-methylstyrene, p-methylstyrene, acrylonitrile or mixtures thereof.

The alkylacrylate rubbers a.3) can be manufactured by crosslinking copolymerisation of preferably $C_2$–$C_8$-alkylacrylates and optionally up to 20 weight % of comonomers, such as styrene, methylmethacrylate, vinylmethylether and/or acrylonitrile, and up to 4 weight % of polyfunctional vinyl monomers and/or allyl monomers, such as divinylbenzene, glycol-bis-acrylate, bisacrylamide, triallyl phosphates, triallyl citrates, triallylcyanurate, triallylisocyanurate, allyl esters of acrylic acid or methacrylic acid, allyl maleats, in particular triallylcyanurate or triallylisocyanurate. The acrylate rubbers preferably used as graft bases have a bimodal distribution of the average particle diameter. Therefore they are preferably mixtures of two particle-type rubbers, wherein one has an average particle diameter ($d_{50}$) of 150 to 250 nm and the other has an average particle diameter ($d_{50}$) of 400 to 600 nm. The weight ratio of fine-particle rubber to coarse-particle rubber is 1:2 to 2:1. There are therefore two maxima in the distribution curve of the average particle diameter of a mixture of the two rubbers which may have the same or different chemical composition.

Particularly suitable coarse-particle rubbers have a core/shell structure (see German Offenlegungsschrift 3 006 804).

Particularly preferred rubbers a.3), i.e. graft bases according to the invention for the preparation of component a) are therefore mixtures of larger rubber particles having core/shell structure and smaller rubber particles without core/shell structure. The rubbers used for graft polymerisation are crosslinked and have gel contents of 50 to 99, preferably 70 to 99 weight %. To prepare a), the vinyl monomers are graft polymerised onto the acrylate rubbers present in emulsion whilst maintaining the emulsion. Styrene and acrylonitrile are preferably employed as vinyl monomers.

The vinyl monomers are preferably polymerised at a graft yield of more than 40 weight %, that is a greater part of the vinyl monomers is chemically bonded to the rubber (via covalent bonds). Such high graft yields are obtained by working in a manner known per se using redox initiators, preferably using combinations of hydrogen peroxide and ascorbic acid, optionally adding suitable heavy metal cations.

Copolymers b) according to the invention are partially crosslinked rubber-type copolymers of acrylonitrile, styrene, $C_1$-$C_6$-alkylmethacrylate, in particular $C_1$-$C_3$-alkylmethacrylate, or mixtures thereof, preferably of acrylonitrile and/or methylmethacrylate and an alkylacrylate, in particular $C_3$-$C_8$-alkylacrylate, and of 0.05 to 5 weight %, relative to the monomers contained in the copolymer, of a polyfunctional, copolymerisable polyvinyl or allyl compound, preferably triallylcyanurate, triallylisocyanurate, vinylethers of polyols, vinyl esters or allyl esters of polyfunctional carboxylic acids and bisacrylamides of diamines. The copolymers b) have gel contents of 20 to 99 weight %, in particular 40 to 99 weight %, a swelling index greater than 10, preferably 10 to 100, measured in dimethylformamide at 23° C. and average particle diameter ($d_{50}$) of 100 to 600 nm, in particular 100 to 300 nm.

The polymers b) can be prepared in known manner by radical, aqueous emulsion polymerisation in the presence of anionic, surface-active materials in the temperature range from 40° to 95° C., in particular 55° to 80° C.

Vinyl polymers c) in the sense of the invention are resin-type polymers or copolymers made from styrenes, such as styrene, α-methylstyrene, p-methylstyrene, acrylonitrile, methacrylonitrile, esters of (meth)acrylic acid, vinyl-$C_1$-$C_4$-carboxylic acids or mixtures of the monomers mentioned having Staudinger indices [$\eta$] of 0.3 to 1.5 dl/g (measured in dimethylformamide at 23° C.) as a measure of the molecular weight. Preferred copolymers made from styrene or α-methylstyrene and acrylonitrile are those which contain optionally up to 40 weight % of acrylic or methacrylic acid esters, in particular methylmethacrylate or butylacrylate.

The vinyl polymers c) are obtained according to conventional processes, for example bulk, solution, suspension or emulsion free-radial polymerisation, preferably by free-radical emulsion polymerisation in water.

Polyesters d) according to the invention are polyesters containing carbonate groups having recurring structural units of the formula

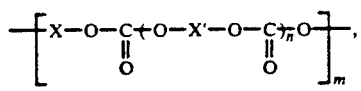

having the abovementioned meaning for X, X', n and m.

Reaction products of multivalent alcohols and multivalent aliphatic carboxylic acids are preferably those of divalent and optionally additionally trivalent alcohols and preferably divalent aliphatic carboxylic acids. (Their radicals correspond to X in formula I.) Instead of the free carboxylic acids, anhydrides or esters thereof may also be used with low alcohols or mixtures thereof. The multivalent carboxylic acids are preferably acyclic. Examples which may be mentioned are oxalic acid, malonic acid, succinic acid, adipic acid, suberic acid, azelaic acid, sebacic acid, hexahydrophthalic acid anhydride, glutaric acid anhydride, preferably adipic acid.

Multivalent alcohols which may be used, optionally in the presence of one another, are, for example, ethylene glycol, 1,2-propylene glycol and 1,3-propylene glycol, 1,4-butylene glycol and 2,3-butylene glycol, 1,6-hexanediol, 1,8-octanediol, neopentyl glycol, cyclohexanedimethanol, 1,4-bis-(hydroxymethylcyclohexane), 2-methyl-1,3-propanediol, diethylene glycol, triethylene glycol, tetraethylene glycol, dipropylene glycol and dibutylene glycol. 1,6-Hexanediol and neopentyl glycol are preferably used.

The reaction products obtained from carboxylic acids and alcohols are polyesters having terminal hydroxyl groups. They have molecular weights of 800 to 5,000; they can be represented by the formula HO—X—OH, wherein X has the abovementioned meaning.

The polyesters containing carbonate groups result from said polyesters having terminal hydroxyl groups, by reacting with bifunctional aryl carbonates.

Bifunctional aryl carbonates are in particular those of the formula

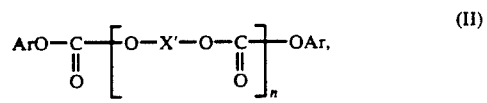

wherein

Ar is a substituted or unsubstituted aryl radical having 6 to 18 carbon atoms, preferably having 6 carbon atoms, n=0 or is 1 to 20, and X' is the bivalent radical of a polyester of polyether as defined above.

Diethylene glycol, triethylene glycol, tetraethylene glycol, dipropylene glycol and dibutylene glycol may be mentioned as diols containing ether groups.

Polyesters containing carbonate groups are preferably prepared by polycondensation in high-viscosity reactors, such as kneaders or extruders (c.f. U.S. Pat. No. 4,192,940).

The polymer mixture of the invention of a) to d) can be prepared, for example as follows:

If a), b) and c) are in aqueous dispersion, the dispersions can be mixed in the ratio of the required solids, and can be worked-up together. The powder formed primarily can optionally be fabricated to granule form and conventionally auxiliaries can be added.

d) is mixed with a), b), and c in known devices, such as extruders, rollers, kneaders or powder mixers.

Components a), b) and c) can also be processed separately and then mixed with d).

Unless otherwise stated, gel contents and swelling indices were determined in dimethylformamide at 23° C. (see M. Hoffmann et al., Polymeranalytik (Polymer analysis) II, Georg-Thieme-Verlag, Stuttgart, 1977). The particle diameters are average particle diameters $d_{50}$ (see also "Ultrazentrifugenmessungen" (Ultracentrifuge measurements), W. Scholtan et al., Kolloidz.

Graft yield is the weight ratio of graft-polymerised, resin-forming monomers to the total amount of resin-forming monomers used.

EXAMPLES

Graft Polymer a)

Preparation of the acrylate rubber (graft base)

The following are placed in a reactor:

17,232 parts by weight of water and 588 parts by weight of a polybutadiene rubber latex having a polymer solids content of 42 weight % and an average particle diameter ($d_{50}$) of 140 nm. After heating the mixture to 63° C., a solution of 49.2 parts by weight of potassium peroxodisulphate and 1,152 parts by weight of water is added. The following mixtures are then fed into the reactor simultaneously in the course of 5 hours at 63° C.

Solution 1:
36,000 parts by weight of n-butylacrylate
81,0 parts by weight of triallylcyanurate Solution 2:
40,800 parts by weight of water
384 parts by weight of sodium $C_{14}$–$C_{18}$-alkylsulphonate.

The mixture is then allowed to polymerise to completion for 4 hours at 63° C. An emulsion having a polymer solids content of 37 weight % is obtained. The average latex particle diameter ($d_{50}$) is 480 nm. The polymer has a gel content of 93 weight %.

Preparation of the graft polymer 734 parts by weight of water, 4,784 parts by weight of latex of the acrylate rubber graft base are placed in a reactor. The reactor is flushed with nitrogen for 30 minutes and the mixture is heated to 70° C. The following solution 1 is added with stirring:

Solution 1:
190 parts by weight of water
6 parts by weight of potassium peroxodisulphate
3 parts by weight of sodium $C_{14}$–$C_{18}$-alkylsulphonate.

The solutions 2 and 3 are then fed into the reactor at 70° C. simultaneously in the course of 5 hours.

Solution 2:
850 parts by weight of styrene
330 parts by weight of acrylonitrile

Solution 3:
1,500 parts by weight of water
20 parts by weight of sodium $C_{14}$–$C_{18}$-alkyl sulphonate.

The mixture is allowed to polymerise to completion for 4 hours at 70° C. An emulsion having a polymer solids content of 35 weight % is obtained. The rubber content of the polymer is 60 weight %.

Copolymer b)

Preparation of the acrylonitrile/n-butylacrylate copolymer

A solution of 2.5 parts by weight of sodium salt of $C_{14}$–$C_{18}$-alkylsulphonic acids and 750 parts by weight of water are placed in a reactor with stirring. After heating to 70° C., 70 parts by weight of solution A) is added and the polymerisation is initiated by adding a solution of 3.5 parts by weight of potassium peroxodisulphate in 50 parts by weight of water. At 70° C. the remainder of solution A) and solution B) are added to the reactor simultaneously in the course of 6 hours and the mixture is polymerised to completion in the course of 4 hours. A latex having a polymer solids content of 38 weight %, having an average particle diameter ($d_{50}$) of 180 nm and a gel content (in dimethylformamide at 23° C.) of 98 weight % is obtained.

Solution A:
1,105 parts by weight of n-butylacrylate
7 parts by weight of triallylcyanurate
474 parts by weight of acrylonitrile Solution B:
30 parts by weight of sodium salt of $C_{14}$–$C_{18}$-alkylsulphonic acids
1,790 parts by weight of water.

Polymer c)

Preparation of the styrene-acrylonitrile copolymer

A solution of 6 parts by weight of disproportionated abietic acid, 4 parts by weight of 1 normal caustic soda in 3,080 parts by weight of water are placed in a reactor, flushed with nitrogen and heated to 70° C. 200 parts by weight of solution A) are added with stirring and the polymerisation is initiated by adding a solution of 8 parts by weight of potassium peroxodisulphate in 200 parts by weight of water. The remainder of solution A) and solution B) are added to the reactor simultaneously in the course of 5 hours at 70° C.

The mixture is allowed to polymerise to completion for 4 hours at 70° C. An emulsion having a polymer solids content of 33 weight % is obtained. The polymer isolated has a Staudinger index [$\eta$] of 0.7 dl/g (in dimethylformamide at 23° C.).

Solution A:
1,994 parts by weight of styrene
756 parts by weight of acrylonitrile
2,6 parts by weight of tert.-dodecylmercaptan Solution B:
54 parts by weight of disproportionated abietic acid
40 parts by weight of normal caustic soda
2,050 parts by weight of water.

Polyester d)

Polyester d.1)

Preparation of a polyester carbonate rubber 1,000 parts by weight of a polyester diol made from adipic acid and a mixture of n-hexane-1,6-diol and neopentyl glycol in a weight ratio of 65:35 having a number average molecular weight $\overline{M}w = 2,000$ g.mole$^{-1}$ (determined via OH number), 107 parts by weight of diphenylcarbonate and 0.12 part by weight of sodium phenolate are stirred in a tank for 2 hours at 130° C. and then stirred for 1 hour at 160° C. under a vacuum of 0.5 torr. Excess phenol is initially distilled off during stirring, and to remove the residual phenol the remaining high viscosity solid is pumped into a screw-extruder (Werner & Pfleiderer ZSK 32) using a geared pump to increase the molar mass (phenol content < 10 ppm, residence time: $\tau \leq 5'$, temperatures in the extruder: Ti = 180° C.). Colourless, high molecular granules are obtained having [$\eta$] 2.3 dl/g (in tetrahydrofurane)

Polyester d.2)

Preparation of a polyester ether carbonate rubber 2,000 parts by weight of a polyester diol made from adipic acid and a mixture of n-hexane-1,6-diol and neopentyl glycol in a weight ratio of 65:35 and a number average molecular weight $\overline{M}_w = 2,000$ g.mole$^{-1}$ (determined by OH number), 24 parts of diphenylcarbonate and 0.12 part of sodium phenolate, are stirred for 2 hours at 130° C. and for 1 hour at 150° C. under a vacuum of 1.0 torr. Excess phenol is distilled off; during the distillation the temperature is kept at 180° C. for 4 hours and 20 parts by weight of polytetrahydrofuran-diol ($\overline{M}_w = 2,000$ g.mole$^{-1}$) having terminal phenylcarbonate groups are added continuously. The reaction temperature increases to 190° C. The mixture is stirred for approximately a further 5 hours. To remove the residual phenol, the remaining high viscosity solid is pumped using a geared pump into a screw extruder (Werner & Pfleiderer ZKS 32) to increase the molar mass (phenol content <10 ppm, $\tau \leq 4'$, temperature in extruder: Ti=200° C.). Colourless, high-molecular granules having [$\eta$]=1.4 dl/g (THF) are obtained.

Preparation and properties of the polymer mixtures

To prepare the polymer mixtures, the latices of components a), b) and c) are mixed in such a way that the solid portions result in the compositions of the polymer mixtures given in Table 1. 1 weight % (relative to solids) of a phenolic stabiliser is added to the latex mixtures and the mixture is coagulated using aqueous magnesium sulphate solution. The powders obtained primarily are filtered off, washed and dried at 60° C. The powders are homogenised with component d) in accordance with Table 1 and 0.4 weight % of ester wax on a mixing roller apparatus for 10 minutes at 190° C., and compressed at 200° C. to give test bodies. The properties of the test bodies are shown in Table 2.

Test methods

| Tensile strength | DIN 53 455 |
| Extension | DIN 53 455 |
| Tear strength | DIN 53 515 |
| Shore hardness | DIN 53 505/type D |
| Cold strength (Drop hammer method) | DIN 53 372 |

Deep-drawing test

A sheet manufactured on a roller (length 300 mm, width 300 mm, thickness 1 mm) is attached to a deep-drawing mould and heated at 160° C. or 175° C. surface temperature (determination of the surface temperature by means of fusible salt). A frustum according to FIG. 1 is pressed to a depth of 21 cm into the sheet while applying a vacuum.

Assessment

+ A hollow body corresponding to the frustum and having even wall thickness is obtained at 160° C. and at 175° C. surface temperature.

comparison of aging resistance of the polymer mixtures 1 and 2 of the invention with known deep-drawing compounds containing polyvinylchloride Sheets made from the materials are stored at 130° C. and 150° C. for 21 days. Whereas the sheets containing polyvinylchloride discolour to dark brown or black, the colour of the sheets of the invention hardly changes.

TABLE 1

| Test No. | Composition of the polymer mixtures Components | | | | |
|---|---|---|---|---|---|
| | a | b | c | $d_1$ | $d_2$ |
| 1 | 36 | 36 | 18 | 10 | — |
| 2 | 36 | 36 | 18 | — | 10 |

TABLE 2

| | Properties of the mixtures of Table 1 | | | | | |
|---|---|---|---|---|---|---|
| Test No. | Tensile strength [MPa] | Extension [%] | Tear strength [N/mm] | Shore hardness [15"] | Cold strength [°C.] | Deep draw behaviour |
| 1 | 15.4 | 265 | 50 | 30 | −19 | + |
| 2 | 14.8 | 253 | 52 | 30 | −21 | + |

We claim:
1. Polymer mixture of
  a) 10 to 60 parts by weight of a graft polymer having a rubber content of 30 to 80% by weight of
    a.1) mixtures of 20 to 40 weight % of acrylonitrile and 80 to 60 weight % of styrenes or alkylmethacrylates or
    a.2) methylmethacrylate, optionally mixed with up to 30, weight % of styrenes or up to 30 weight % of alkylacrylates or up to 19 weight % of acrylonitrile, onto
    a.3) a particle-type highly crosslinked alkylacrylate rubber which optionally contains polymerised up to 30 weight %, of dienes, having an average particle diameter ($d_{50}$) of 80 to 1,000 nm,
  b) 10 to 50 parts by weight of a partially crosslinked rubber copolymer made from 5 to 40 weight % of acrylonitrile, styrene, alkylmethacrylate or mixtures thereof and 95 to 60 weight % of alkylacrylate having a gel content of 20 to 99 weight, a swelling index greater than 10, measured in dimethylformamide at 23° C., and an average particle diameter ($d_{50}$) of 100 to 600 nm,
  c) 5 to 40 parts by weight of a non-crosslinked polymer of styrenes, acrylonitrile, methacrylonitrile, esters of (meth)acrylic acid, vinyl-$C_1$-$C_4$-carboxylic acids or mixtures of these monomers having Staudinger indices [$\eta$] (measured in dimethylformamide at 23° C.) of 0.3 to 1.5 dl/g, and
  d) 1 to 40 parts by weight of a polyester containing carbonate groups and having recurring structural units of the formula

$$\left[ X-O-\underset{\underset{O}{\|}}{C}+O-X'-O-\underset{\underset{O}{\|}}{C}\overline{\jmath}_n O \right]_m,$$

in which
X is the radical of a reaction product of a multivalent alcohol and a multivalent aliphatic carboxylic acid having a molecular weight of 800 to 5,000,
X'=X or is the radical of an aliphatic polyether of molecular weight 800 to 5,000,
n=O or is 1 to 20, and
m denotes a number greater than 20.
2. Deep-drawable, flexible sheets made from the polymer mixtures of claim 1.

* * * * *